(12) United States Patent
Becker et al.

(10) Patent No.: US 11,428,142 B2
(45) Date of Patent: Aug. 30, 2022

(54) DETECTING A MODIFICATION OF A PARTICLE FILTER FOR AN EXHAUST BRANCH OF A MOTOR VEHICLE

(71) Applicant: Bayerische Motoren Werke Aktiengesellschaft, Munich (DE)

(72) Inventors: Marius Becker, Unterfoehring (DE); Daniela Calinski, Karlsfeld (DE); Christopher Oberroithmair, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/260,474

(22) PCT Filed: Jul. 24, 2019

(86) PCT No.: PCT/DE2019/100676
§ 371 (c)(1),
(2) Date: Jan. 14, 2021

(87) PCT Pub. No.: WO2020/030216
PCT Pub. Date: Feb. 13, 2020

(65) Prior Publication Data
US 2021/0270178 A1    Sep. 2, 2021

(30) Foreign Application Priority Data
Aug. 10, 2018 (DE) ...................... 10 2018 213 469.3

(51) Int. Cl.
*F01N 11/00* (2006.01)
*F01N 13/00* (2010.01)

(52) U.S. Cl.
CPC .......... *F01N 11/002* (2013.01); *F01N 13/011* (2014.06); *F01N 2550/24* (2013.01);
(Continued)

(58) Field of Classification Search
CPC .. F01N 11/002; F01N 13/011; F01N 2550/24; F01N 2560/06; F01N 2560/08; F01N 2900/1404; F01N 2900/1406
See application file for complete search history.

(56) References Cited

U.S. PATENT DOCUMENTS 5,551,971 A * 9/1996 Chadderton ............ F01N 9/002
                                                          95/20
6,090,187 A * 7/2000 Kumagai ............ F01N 13/0097
                                                          60/303
(Continued)

FOREIGN PATENT DOCUMENTS

DE    10 2005 043 161 A1    3/2007
DE    10 2013 221 598 A1    5/2015
(Continued)

OTHER PUBLICATIONS

International Search Report (PCT/ISA/210) issued in PCT Application No. PCT/DE2019/100676 dated Oct. 8, 2019 with English translation (four (4) pages).
(Continued)

*Primary Examiner* — Matthew T Largi
(74) *Attorney, Agent, or Firm* — Crowell & Moring LLP

(57) ABSTRACT

A system for identifying a modification of a component in an exhaust gas line of a motor vehicle, includes a particulate filter, a diagnostic system, a first temperature sensor, a second temperature sensor, and an evaluation unit. The evaluation unit is configured to receive from the first temperature sensor a first temperature variable which is characteristic of a first exhaust gas temperature and to receive from the second temperature sensor a second temperature variable which is characteristic of a second exhaust gas temperature. The evaluation unit is also configured to compare the temperature variables or comparison variables which are derived therefrom with each other. Depending on
(Continued)

the comparison, the evaluation unit is also configured to determine a modification of the particulate filter.

5 Claims, 2 Drawing Sheets

(52) U.S. Cl.
CPC ...... *F01N 2560/06* (2013.01); *F01N 2560/08* (2013.01); *F01N 2900/1404* (2013.01); *F01N 2900/1406* (2013.01)

(56) References Cited

U.S. PATENT DOCUMENTS

| | | | | |
|---|---|---|---|---|
| 6,770,116 | B2* | 8/2004 | Kojima | F01N 3/032 55/484 |
| 2009/0007546 | A1* | 1/2009 | Ueda | F01N 13/0097 60/297 |
| 2009/0229256 | A1* | 9/2009 | Suzuki | F01N 3/0253 60/299 |
| 2011/0047973 | A1* | 3/2011 | Wilhelm | F01N 3/035 60/287 |
| 2016/0084137 | A1 | 3/2016 | Cunningham et al. | |
| 2016/0265413 | A1 | 9/2016 | Willimowski et al. | |
| 2017/0030245 | A1* | 2/2017 | Bökelund | F01N 11/00 |
| 2018/0258825 | A1* | 9/2018 | Pietila | F01N 9/002 |

FOREIGN PATENT DOCUMENTS

| | | |
|---|---|---|
| FR | 3 019 212 A1 | 10/2015 |
| FR | 3 034 808 A1 | 10/2016 |
| WO | WO 2005/070175 A2 | 8/2005 |

OTHER PUBLICATIONS

German-language Written Opinion (PCT/ISA/237) issued in PCT Application No. PCT/DE2019/100676 dated Oct. 8, 2019 with English translation (six (6) pages).

German-language Search Report issued in German Application No. 10 2018 213 469.3 dated Mar. 14, 2019 with partial English translation (11 pages).

* cited by examiner

DETECTING A MODIFICATION OF A PARTICLE FILTER FOR AN EXHAUST BRANCH OF A MOTOR VEHICLE

BACKGROUND AND SUMMARY OF THE INVENTION

This disclosure relates to a diagnostic system, an evaluation unit and a method for identifying a modification of a particulate filter for an exhaust gas line of a motor vehicle.

There are methods in which a modification of a particulate filter for an exhaust gas line of a motor vehicle is carried out by evaluating exhaust gas pressure or exhaust gas temperature. In this instance, an exhaust gas pressure or an exhaust gas temperature is measured or modelled upstream of the particulate filter. In addition, an exhaust gas pressure or an exhaust gas temperature is measured or modelled behind the particulate filter. By evaluating the pressure or temperature difference, in this instance a modification of the particulate filter is determined.

The disadvantage of these methods which work with values measured by means of sensors is that in this instance a sensor has to be arranged upstream of the particulate filter, which may not be possible, for example, as a result of a lack of structural space.

The disadvantage of these methods which work with modelled values is that the models do not reflect reality accurately enough to be able to determine all the relevant modifications of the particulate filter.

An object of this disclosure is to provide a diagnostic system, an evaluation unit and a method for identifying a modification of a particulate filter which at least partially overcome the disadvantages mentioned.

This and other objects are achieved by the features of the inventive system, apparatus, and method disclosed herein. It should be noted that additional features of a patent claim which is dependent on an independent patent claim without the features of the independent patent claim or only in combination with a part-quantity of the features of the independent patent claim may form an individual invention which is independent of the combination of all the features of the independent patent claim and which can be made to be the subject-matter of an independent claim, a divisional application or a subsequent application. This applies in the same manner to aspects of technical teaching which are described in the description and which may form an invention which is independent of the features of the independent patent claims.

A first aspect of this disclosure relates to a system for identifying a modification of a particulate filter, for example, an Otto or diesel particulate filter, for an exhaust gas line of a motor vehicle.

The modification of the particulate filter may in particular be a complete or partial disassembly of the particulate filter or the filter substrate which is contained in the particulate filter.

The particulate filter comprises in this instance at least a first and a second filter unit which are arranged parallel with each other in the exhaust gas line.

In particular, consequently, the particulate filter is an actual or virtual particulate filter system which comprises at least two independent particulate filters.

Alternatively, the particulate filter is in particular a particulate filter which comprises two filter units which are independent of each other.

The filter units may in particular be arranged in a parallel manner in a twin-pipe exhaust gas line.

The diagnostic system comprises an evaluation unit and at least a first and a second temperature sensor. The first temperature sensor is arranged downstream in terms of the exhaust gas flow behind the first filter unit and the second temperature sensor is arranged downstream in terms of the exhaust gas flow behind the second filter unit.

The evaluation unit which is included, for example, by a control unit, is configured to receive from the first temperature sensor a first temperature variable which is characteristic of a first exhaust gas temperature and to receive from a second temperature sensor a second temperature variable which is characteristic of a second exhaust gas temperature.

The temperature variables may, for example, be an absolute temperature indication.

Furthermore, the evaluation unit is configured to compare the temperature variables or comparison variables which are derived therefrom with each other and, depending on the comparison, to determine a modification of the particulate filter.

The comparison in this instance is in particular a determination of whether the compared values are substantially identical. In addition, for example, when it is determined that the compared values are substantially not equal, a deviation between the compared values can be determined.

In this instance, this disclosure is based on the recognition that the exhaust gas temperature and a change of the exhaust gas temperature downstream in terms of the exhaust gas flow behind the filter units is substantially equal if both filter units have not been modified. Since a filter unit absorbs heat, it acts where applicable as a heat sink with regard to the exhaust gas temperature, or as a filter with regard to the change of the exhaust gas temperature. If a filter unit has thus been modified and, for example, disassembled, there is produced a difference both between the exhaust gas temperatures and between the modifications of the exhaust gas temperatures.

In an advantageous embodiment, the evaluation unit is configured to determine a temperature difference between the temperature variables which were received and, when a threshold value for the temperature difference is reached or exceeded, to determine the modification of the particulate filter, that is to say, a partial disassembly of a filter unit.

In another advantageous embodiment, the evaluation unit is configured, when the threshold value for the temperature difference is reached or exceeded, by comparing the temperature variables received, to establish the temperature sensor whose temperature variable in comparison with the temperature variables of the other temperature sensors in each case is characteristic of the highest exhaust gas temperature.

Furthermore, the evaluation unit is configured to determine the modification of the filter unit, that is to say, the disassembly of the filter unit which is located in the exhaust gas line upstream in terms of the exhaust gas flow in front of the established temperature sensor.

In this instance, this disclosure is based on the recognition that a filter unit acts as a heat sink and can consequently cool the exhaust gas.

In another advantageous embodiment, the first comparison variable is a temperature gradient of the first temperature variable and the second comparison variable is a temperature gradient of the second temperature variable.

The evaluation unit is configured in this instance to determine a gradient difference between the determined temperature gradients and, when a threshold value for the gradient difference is reached or exceeded, to determine the modification of the particulate filter.

In another advantageous embodiment, the evaluation unit is configured, when the threshold value for the gradient difference is reached or exceeded, by comparing the temperature gradients determined, to establish the temperature sensor whose temperature gradient in comparison with the temperature gradients of the other temperature sensors is in each case characteristic of the greatest change of the exhaust gas temperature.

Furthermore, the evaluation unit is configured to determine the modification of the filter unit, that is to say, the disassembly of the filter unit which is located in the exhaust gas line upstream in terms of the exhaust gas flow in front of the established temperature sensor.

In this instance, this disclosure is based on the recognition that a filter unit can act as a deep-pass filter with respect to a change of the exhaust gas temperature and can consequently damp changes of the exhaust gas temperature.

In another advantageous embodiment, the evaluation unit is configured to receive, or to determine by means of a model, a first pressure variable which is characteristic of the exhaust gas pressure upstream in terms of the exhaust gas flow in front of the particulate filter from a first pressure sensor which is included by the diagnostic system and which is located upstream in terms of the exhaust gas flow in front of the particulate filter and to receive, or to determine by means of a model, a second pressure variable which is characteristic of the exhaust gas pressure downstream in terms of the exhaust gas flow behind the particulate filter from a second pressure sensor which is included by the diagnostic system and which is located downstream in terms of the exhaust gas flow behind the particulate filter.

Furthermore, the evaluation unit is configured to determine a deviation of the received or determined pressure variables and, when a value has reached or fallen below a threshold value for the deviation of the received or determined pressure variables, to determine a modification of the particulate filter, that is to say, a complete disassembly of the particulate filter.

In this instance, this disclosure is based on the recognition that, as a result of the described comparison of temperature variables or comparison variables which are derived therefrom, a modification of individual filter units can be determined, but not an identical modification of all filter units, for example, a complete disassembly of the particulate filter. An identical modification of all filter units can, however, be determined by means of an evaluation of the exhaust gas pressure difference in front of and behind the particulate filter. A pressure sensor may in this instance be arranged upstream in terms of the exhaust gas flow in front of the particulate filter at a greater distance from the particulate filter than would be necessary for any temperature sensor in order to determine a differential temperature via the particulate filter. Consequently, even with a difficult structural space situation directly in front of the particulate filter, which makes an arrangement of a temperature sensor impossible, a pressure sensor can nonetheless potentially be arranged at a greater distance from the particulate filter.

This disclosure also relates to an evaluation unit for identifying a modification of a particulate filter in an exhaust gas line of a motor vehicle.

The evaluation unit is configured to receive from at least two temperature sensors which are arranged in the exhaust gas line downstream in terms of the exhaust gas flow in each case behind a filter unit of the particulate filter, a temperature variable which is characteristic of an exhaust gas temperature, wherein the filter units are arranged parallel with each other in the exhaust gas line.

Furthermore, the evaluation unit is configured to determine a deviation of the temperature variables received or a deviation in comparison variables determined from the temperature variables and, in the event of a determined deviation, to determine a modification of the particulate filter.

This disclosure also relates to a diagnostic method for identifying a modification of a particulate filter for an exhaust gas line of a motor vehicle, wherein the particulate filter comprises at least a first and a second filter unit which are fitted parallel with each other in the exhaust gas line.

A step of the method is receiving a first temperature variable which is characteristic of a first exhaust gas temperature downstream in terms of the exhaust gas flow behind the first filter unit.

Another step of the method is receiving a second temperature variable which is characteristic of a second exhaust gas temperature downstream in terms of the exhaust gas flow behind the second filter unit.

Another step of the method is comparing the temperature variables or comparison variables which are derived therefrom with each other.

Another step of the method is determining a modification of the particulate filter in accordance with the comparison.

The above statements relating to the diagnostic system according to the invention according to the first aspect of the invention also apply accordingly to the evaluation unit according to the invention according to the second aspect of the invention and the diagnostic method according to the invention according to the third aspect of the invention. Advantageous embodiments of the evaluation unit according to the invention and the diagnostic method according to the invention which are not explicitly described at this location and in the patent claims correspond to the advantageous embodiments of the diagnostic system according to the invention described above or described in the patent claims.

This disclosure is now described below with reference to an embodiment with reference to the appended drawings, in which:

DETAILED DESCRIPTION OF THE DRAWINGS

Figure 1:
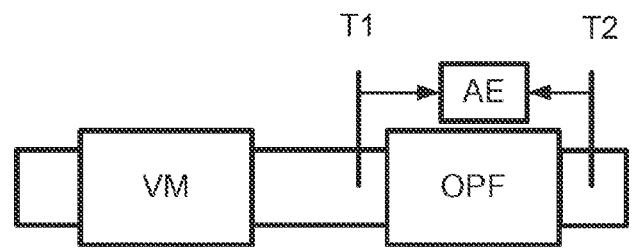
FIG. 1 shows a conventional system for identifying a modification of a particulate filter.

FIG. 1 shows a conventional system for identifying a modification of a particulate filter.

In this instance, the particulate filter OPF is arranged in the exhaust gas line downstream in terms of the exhaust gas flow behind an internal combustion engine VM.

The conventional system comprises an evaluation unit AE and a first temperature sensor T1 and a second temperature sensor T2, wherein the first temperature sensor T1 is arranged upstream in terms of the exhaust gas flow in front of the particulate filter OPF and the second temperature sensor T2 is arranged downstream in terms of the exhaust gas flow behind the particulate filter OPF.

The evaluation unit AE is configured to receive from the first temperature sensor T1 a first temperature variable which is characteristic of a first exhaust gas temperature, and to receive from the second temperature sensor T2 a second temperature variable which is characteristic of a second exhaust gas temperature, to compare the temperature variables or comparison variables which are derived therefrom with each other and, depending on the comparison, to determine a modification of the particulate filter OPF.

In particular in this instance, a modification of the particulate filter OPF is determined when the temperature variables are substantially identical.

Figure 2:
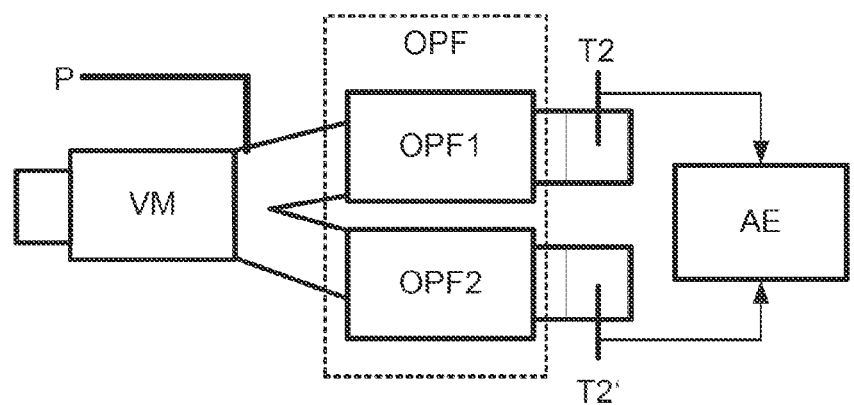
FIG. 2 shows an inventive system for identifying a modification of a particulate filter.

FIG. 2 shows an inventive diagnostic system for identifying a modification of a particulate filter OPF of an exhaust gas line of a motor vehicle.

In this instance, the particulate filter OPF is arranged downstream in terms of the exhaust gas flow behind an internal combustion engine VM in the exhaust gas line.

The particulate filter OPF comprises at least a first filter unit OPF1 and a second filter unit OPF2 which are arranged parallel with each other in the exhaust gas line.

Furthermore, the diagnostic system comprises an evaluation unit AE and at least a first temperature sensor T2 and a second temperature sensor T2', wherein the first temperature sensor T2 is arranged downstream in terms of the exhaust gas flow behind the first filter unit OPF1 and the second temperature sensor T2' is arranged downstream in terms of the exhaust gas flow behind the second filter unit OPF2.

This evaluation unit AE is configured to receive from the first temperature sensor T2 a first temperature variable which is characteristic of a first exhaust gas temperature and to receive from the second temperature sensor T2' a second temperature variable which is characteristic of a second exhaust gas temperature.

Furthermore, the evaluation unit is configured to compare the temperature variables or comparison variables which are derived therefrom with each other and, depending on the comparison, to determine a modification of the particulate filter OPF.

Figure 3:
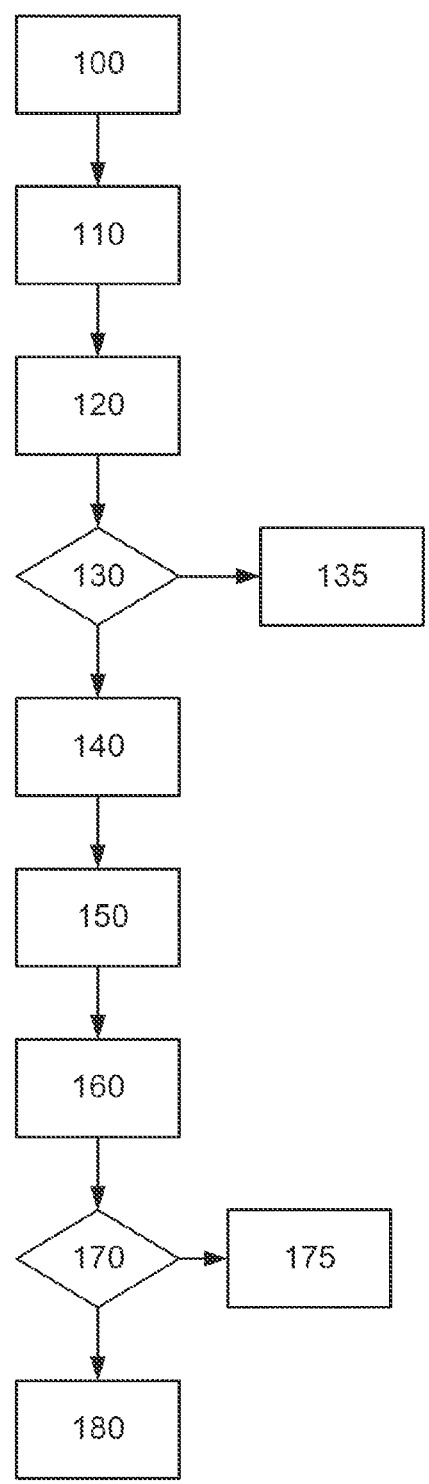
FIG. 3 shows a procedure of the inventive method.

FIG. 3 shows an embodiment of the inventive diagnostic method for identifying a modification of a particulate filter OPF for an exhaust gas line of a motor vehicle, wherein the particulate filter OPF comprises at least a first filter unit OPF1 and a second filter unit OPF2, which are fitted parallel with each other in the exhaust gas line.

One step of the method is receiving 100 a first temperature variable which is characteristic of a first exhaust gas temperature downstream in terms of the exhaust gas flow behind the first filter unit OPF1.

Another step of the method is receiving 110 a second temperature variable which is characteristic of a second exhaust gas temperature downstream in terms of the exhaust gas flow behind the second filter unit OPF2.

Another step of the method is the comparison 120 of the temperature variables or comparison variables which are derived therefrom with each other.

In particular, a temperature difference between the temperature variables received can be determined as a comparison of the temperature variables.

Alternatively, in particular the first comparison variable may be a temperature gradient of the first temperature variable and the second comparison variable may be a temperature gradient of the second temperature variable.

As a comparison of the comparison variables, it is then possible, for example, to determine a gradient difference between the determined temperature gradients.

Another step of the method is determining 130 a modification of the particulate filter OPF depending on the comparison.

Particularly if, as a comparison, a temperature difference between the temperature variables received was determined, when a threshold value for the temperature difference is reached or exceeded, the modification of the particulate filter OPF can be determined.

If, alternatively, as a comparison, a gradient difference between temperature gradients was determined, particularly when reaching or exceeding a threshold value for the gradient difference the modification of the particulate filter OPF can be determined.

In particular, a partial disassembly 135 of the first filter unit OPF1 or a partial disassembly of the second filter unit OPF2 can be determined as a modification of the particulate filter OPF.

Particularly when, as a comparison, a temperature difference between the temperature variables received was determined, by comparing the temperature variables received it is possible to determine the temperature sensor T2 whose temperature variable in comparison with the temperature variable of the other temperature sensor T2' is characteristic of the highest exhaust gas temperature. Subsequently, the modification of the filter unit OPF1 which is located in the exhaust gas line upstream in terms of the exhaust gas flow in front of the established temperature sensor T2 can be determined.

Particularly when, alternatively, as a comparison, a gradient difference has been determined, by comparing the determined temperature gradients it is possible to determine the temperature sensor T2 whose temperature gradient in comparison with the temperature gradient of the other temperature sensor T2' is characteristic of the greatest change of the exhaust gas temperature. Subsequently, the modification of the filter unit OPF1, which is located in the exhaust gas line upstream in terms of the exhaust flow in front of the established temperature sensor T2 can be determined.

If no modification of the particulate filter OPF was previously determined, another step of the method is receiving 140 a first pressure variable which is characteristic of the exhaust gas pressure upstream in terms of the exhaust flow in front of the particulate filter OPF from a pressure sensor P which is included by the diagnostic system and which is located upstream in terms of the exhaust gas flow in front of the particulate filter OPF.

Another step of the method is then determining 150 a second pressure variable which is characteristic of the exhaust gas pressure downstream in terms of the exhaust gas flow behind the particulate filter OPF using a model.

Another step of the method is determining 160 a deviation of the pressure variable received and the pressure variable determined by means of the model.

Another step of the method is determining 170 a modification of the particulate filter OPF when a value reaches or falls below a threshold value for the deviation of the received or determined pressure variables a modification of the particulate filter OPF.

It is possible in particular to determine a complete disassembly 175 of the particulate filter OPF as a modification of the particulate filter OPF, that is to say, a disassembly of the first filter unit OPF1 and a disassembly of the second filter unit OPF2.

Otherwise, it can also be determined (180) that the particulate filter OPF has not been modified.

What is claimed is:
1. A system for identifying a modification of a component in an exhaust gas line of a motor vehicle, comprising:

a particulate filter having at least a first filter unit and a second filter unit which are arranged in parallel with each other in the exhaust gas line, a diagnostic system having an evaluation unit and at least a first temperature sensor and a second temperature sensor, wherein the first temperature sensor is arranged downstream in terms of an exhaust gas flow behind the first filter unit, the second temperature sensor is arranged downstream in terms of the exhaust gas flow behind the second filter unit, and the evaluation unit is configured to:

receive from the first temperature sensor a first temperature variable which is characteristic of a first exhaust gas temperature and to receive from the second temperature sensor a second temperature variable which is characteristic of a second exhaust gas temperature, compare the first and second temperature variables or first and second comparison variables which are derived therefrom with each other, and depending on the comparison, to determine the modification of the particulate filter, wherein the evaluation unit is also configured to:

determine a temperature difference between the first and second temperature variables which were received, and when a threshold value for the temperature difference is reached or exceeded, to determine the modification of the particulate filter.

2. The system according to claim 1, wherein the evaluation unit is also configured, when the threshold value for the temperature difference is reached or exceeded, to:

by comparing each temperature variable received, establish a temperature sensor of the at least first and second temperature sensors whose temperature variable in comparison with each of the respective temperature variables of the other at least first and second temperature sensors in each case is characteristic of a highest exhaust gas temperature, and determine the modification of the filter unit which is located in the exhaust gas line upstream in terms of the exhaust gas flow in front of the established temperature sensor.

3. The system according to claim 1, wherein the first comparison variable is a temperature gradient of the first temperature variable, and the second comparison variable is a temperature gradient of the second temperature variable, and the evaluation unit is also configured to:

determine a gradient difference between each determined temperature gradients, and when a threshold value for the gradient difference is reached or exceeded, to determine the modification of the particulate filter.

4. The system according to claim 3, wherein the evaluation unit is also configured, when the threshold value for the gradient difference is reached or exceeded, to:

by comparing each determined temperature gradient, establish a temperature sensor of the at least first and second temperature sensors whose respective temperature gradient in comparison with each of the respective temperature gradients of the other at least first and second temperature sensors is characteristic of a greatest change of the exhaust gas temperature, and determine the modification of the filter unit which is located in the exhaust gas line upstream in terms of the exhaust gas flow in front of the established temperature sensor.

5. The system according to claim 4, wherein the evaluation unit is also configured to:

receive, or determine by means of a model, a first pressure variable which is characteristic of an exhaust gas pressure upstream in terms of the exhaust gas flow in front of the particulate filter from a first pressure sensor which is included in the diagnostic system and which is located upstream in terms of the exhaust gas flow in front of the particulate filter, receive, or determine by means of a model, a second pressure variable which is characteristic of an exhaust gas pressure downstream in terms of the exhaust gas flow behind the particulate filter from a second pressure sensor which is included in the diagnostic system and which is located downstream in terms of the exhaust gas flow behind the particulate filter, determine a deviation of the received or determined first and second pressure variables, and when a value has reached or fallen below a threshold value for the deviation of the received or determined first and second pressure variables, to determine the modification of the particulate filter.

* * * * *